United States Patent [19]

Schrimsher

[11] E Re. 30,816

[45] Reissued Dec. 8, 1981

[54] DOOR LATCH FOR A PRESSURE VESSEL

[75] Inventor: Albert E. Schrimsher, Kansas City, Mo.

[73] Assignee: Hobart Corporation, Troy, Ohio

[21] Appl. No.: 963,510

[22] Filed: Nov. 24, 1978

Related U.S. Patent Documents

Reissue of:

[64] Patent No.: 3,961,817
Issued: Jun. 8, 1976
Appl. No.: 535,380
Filed: Dec. 23, 1974

[51] Int. Cl.[2] ..... E05C 5/04

[52] U.S. Cl. ..... 292/336.3; 220/244

[58] Field of Search ..... 292/336.3, 259, 260, 292/159; 220/25, 224, 243, 244

[56] References Cited

U.S. PATENT DOCUMENTS 2,548,691 4/1951 Vischer, Jr. ..... 220/244 X
3,409,164 11/1968 Vischer, Jr. ..... 220/243

*Primary Examiner*—Richard E. Moore
*Attorney, Agent, or Firm*—Biebel, French & Nauman

[57] ABSTRACT

A pressure vessel such as a steam cooker has a novel variably sloped cam arrangement for sealing a warped access door against the inside of an access opening. Such access openings are typically of circular configuration, and the access doors are warped about one axis for insertion therethrough. The latching mechanism of this invention enables the door to be swung from an open position into a first position inside the pressure vessel and then to be moved rapidly into a second position in engagement with an inside rim of the access opening. This rapid movement is accomplished by rotation of an operating handle through a relatively small angle. Thereafter continued rotation of the handle stresses the access door, removing the warp therefrom and sealing the door against the inside rim of the access opening. The latter door stressing rotation produces relatively little motion of the door for a relatively large angular rotation of the operating handle. Thus there is achieved a relatively large mechanical advantage during the actual stressing of the door, while minimizing the amount of operating handle rotation required during that portion of door movement wherein a large mechanical advantage is not necessary.

There is further disclosed a novel shift plate arrangement which causes both rectilinear and angular shifting of the access door during movement between the above mentioned first and second positions. This avoids manual shifting of the door and enables door latching by merely swinging the door into the closed position and actuating the operating handle. Door opening is accomplished by a sequence which is the reverse of the latching sequence.

28 Claims, 9 Drawing Figures

DOOR LATCH FOR A PRESSURE VESSEL

Matter enclosed in heavy brackets [ ] appears in the original patent but forms no part of this reissue specification; matter printed in italics indicates the additions made by reissue.

BACKGROUND OF THE INVENTION

This invention deals generally with latching mechanism for doors employed in pressure vessels. Such doors find use, for instance, in steam cookers, ink supply tanks, surgical instrument sterilizers, and pressurized airplane cabins. In the particular embodiment the invention relates to latching mechanism for doors utilized in pressure vessels of the type shown in Vischer U.S. Pat. No. 2,904,212 and in Vischer U.S. Pat. No. 3,409,164. These pressure vessels are used for food preparation in restaurants and institutional kitchens and employ a generally circular access door which is structurally warped about one axis. During use the door is positioned inside the pressure vessel, which has a circular access opening slightly smaller in diameter than the non warped diameter of the door. The door warp facilitates insertion of the door through the access opening, and after insertion through the access opening the door is stressed against an interior rim of the access opening to achieve an air tight seal. As the stressing takes place the door is flexed to remove the warp and assume the configuration of a spherical section of circular outline.

For opening or closing of doors of the type shown in the Vischer patents, the door is mounted on a support arm, which in turn is attached to the exterior of the pressure vessel along a moveable hinge line. This hinge line is moveable between a first point enabling door passage through the access opening and a second point enabling centering of the door within the access opening. During a typical door closing sequence the hinge line is initially in its first position, and the door is manually inserted through the access opening until it is inside the pressure vessel and clear of the rim of the access opening. Thereafter the door and its hinge line are shifted until door centering within the access opening is accomplished. From this centered position the door is pulled outwardly toward the door support arm, thereby contacting the rim of the access opening and commencing the above mentioned flexing sequence. Means are provided for securing the door in its sealed position.

For accomplishing the above mentioned door sealing action, there may be provided a camming assembly as shown in Vischer U.S. Pat. No. 2,904,212 or a worm and crank arrangement as shown in Vischer U.S. Pat. No. 3,409,164. The assembly of Vischer U.S. Pat. No. 2,904,212 is best applied to fairly small doors, because the available mechanical advantage for door flexing is rather small. The arrangement of Vischer U.S. Pat. No. 3,409,164 provides a much larger mechanical advantage and is therefore better suited for usage with larger doors. In this latter arrangement the available mechanical advantage depends upon the pitch of the worm and this may be selected to meet the particular application. Doors built in accordance with Vischer U.S. Pat. No. 3,409,164 necessarily require a fairly large amount of handle turning and therefore are not as fast to operate as doors [build] *built* in accordance with Vischer U.S. Pat. No. 2,904,212.

SUMMARY OF THE INVENTION

This invention enables sealing of a warped door for a pressure vessel with relatively little physical exertion and yet with a quick and simple sealing motion. For accomplishing the improved sealing action the door is supported by a stem which is urged inwardly or outwardly by rotation of a cooperatively configured cam arrangement. Preferably the cam comprises a hollow cylindrical member surrounding the door support stem, and the cam has a helical slot which mates with a projection on the door support stem to produce the above mentioned door movement when the cam is rotated.

The cam is mounted on a door support arm and is rotated by manual movement of an operating handle connected thereto. The helical slot, which functions as the camming surface has a variable pitch angle, so that when the door has been swung closed to a first position within the vessel, and rotation of the operating handle has commenced, a relatively small rotation of the handle produces rapid outward movement of the door to a second position in contact with the inside rim of the access opening. Thereafter a reduced pitch angle provides the necessary mechanical advantage for stressing the door sealingly against the inside rim of the access opening at the expense of relatively little physical effort. Preferably the helical slot has a short extent of zero degrees pitch in that region which is engaged by the stem projection when the door is fully latched. This prevents the door stresses from initiating an unlatching sequence.

The door support arm has a fixed hinge line and is provided with a shift plate which cooperates with a lug on the door closer cam to provide automatic rectilinear and angular door shifting. When the operating handle is rotated to unlatch the door, the door initially moves inwardly into a stress relieved position, which is the second position mentioned above. Thereafter during continued inward movement away from the inner rim of the access door, the cam lug cooperates with a first lip on the shift plate to shift the door laterally toward the hinge line of the door support arm while concomitantly causing an angular door movement as described in detail below in the description of the preferred embodiment. The door is then in the above mentioned first position, and there is no need for manual shifting of the hinge line prior to opening of the door.

During the latching sequence, when the door moves from its first to its second position, the lug on the door closer cam contacts a second lip on the shft plate to shift the door laterally and angularly into a position centered within the access opening. This door shifting during latching is a reversal of the shifting action which takes place during unlatching and is completed before the door comes into contact with the rim of the access opening.

It is therefore an object of this invention to provide an improved door sealing mechanism for a pressure vessel such as a steam cooker or the like.

It is another object of the invention to provide a steam cooker having a sealing mechanism of a type wherein an initially warped door may be inserted through an access opening and then pulled sealingly outwardly by a quick and easy rotation of an operating handle.

Still another object of the invention is to provide improved means for laterally centering and angularly positioning an interiorly situated access door against an access opening for sealing of said opening by the access door.

Other objects and advantages of the invention will be apparent from the following description, the accompanying drawings and the appended claims.

DESCRIPTION OF THE PREFERRED EMBODIMENTS

Figure 1:
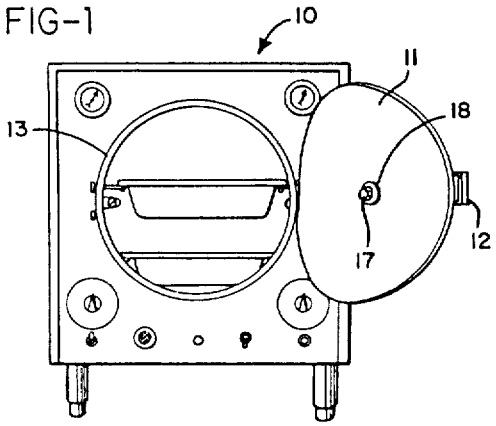
FIG. 1 illustrates a steam cooker with a warped access door in the fully opened position.

FIG. 1 illustrates a typical pressure cooker 10 having a door 11 which is warped about a horizontal axis. Door 11 is supported by a door support arm 12 which in turn is hinged along a fixed hinge line 15 (FIG. 2) to the front face of cooker 10. Door 11 is laterally movable toward and away from hinge line 15, and in the fully opened position as illustrated in FIG. 1, door 11 is normally in the lateral position nearest the hinge line. This position of door 11 enables the door to be swung closingly through access opening 13 of pressure cooker 10 as to the position of FIG. 2. The closing motion progresses as illustrated by positions A, B and C shown in phantom lines in FIG. 7. This closing action is similar to a prior art closing action as taught by Vischer U.S. Pat. No. 2,904,212. However, it is to be noted that in the Vischer patent the hinge line of the door support arm is movable to accomplish door closing and latching, whereas in this invention the door support arm has a fixed hinge line with the door being laterally and angularly movable relative to the door support arm.

Figure 7:
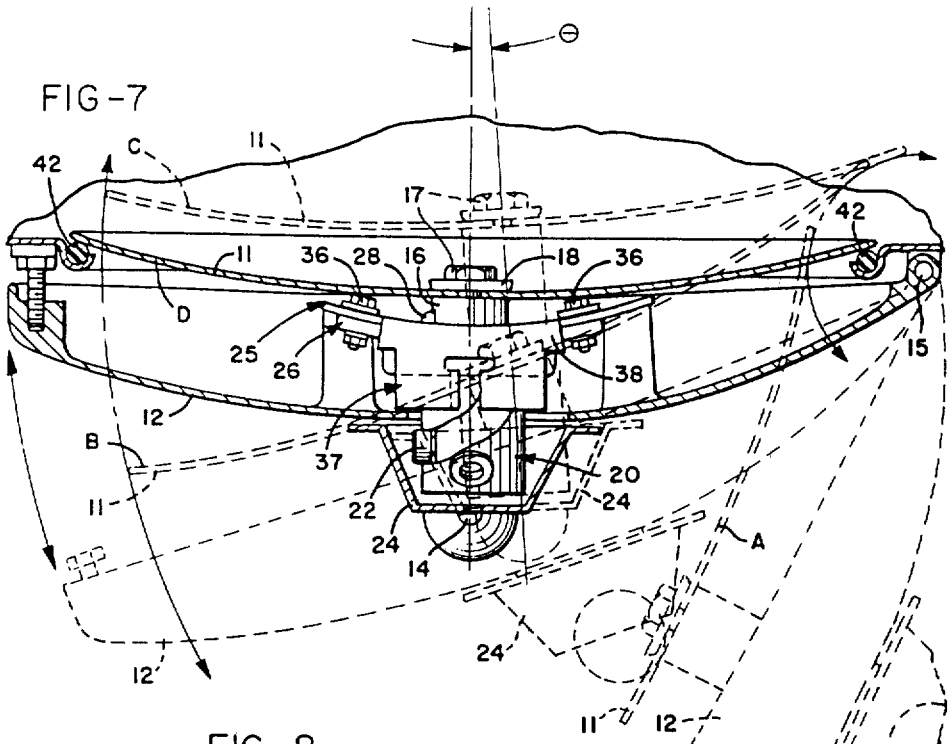
FIG. 7 is a downwardly looking sectional drawing showing a door in the fully latched position.

After the door 11 has been swung inwardly through access opening 13 to position C of FIG. 7, operating handles 14 are rotated clockwise to align the door with the access opening and also to pull it longitudinally outward toward arm 12. This outward movement of door 11 first brings it into contact with the inside of rim 42 of access opening 13, and continued movement thereafter stresses the door against rim 42 to remove the warp therefrom. The door thus assumes a generally spherical configuration for sealing engagement against rim 42. The final sealed position of door 11 is shown in solid lines as position D of FIG. 7.

Figure 3A:
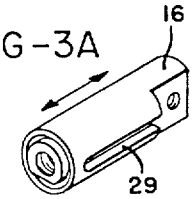
FIG. 3A illustrates a door support stem in a position which is rotated from the operating position as illustrated in FIG. 3.
Figure 3:
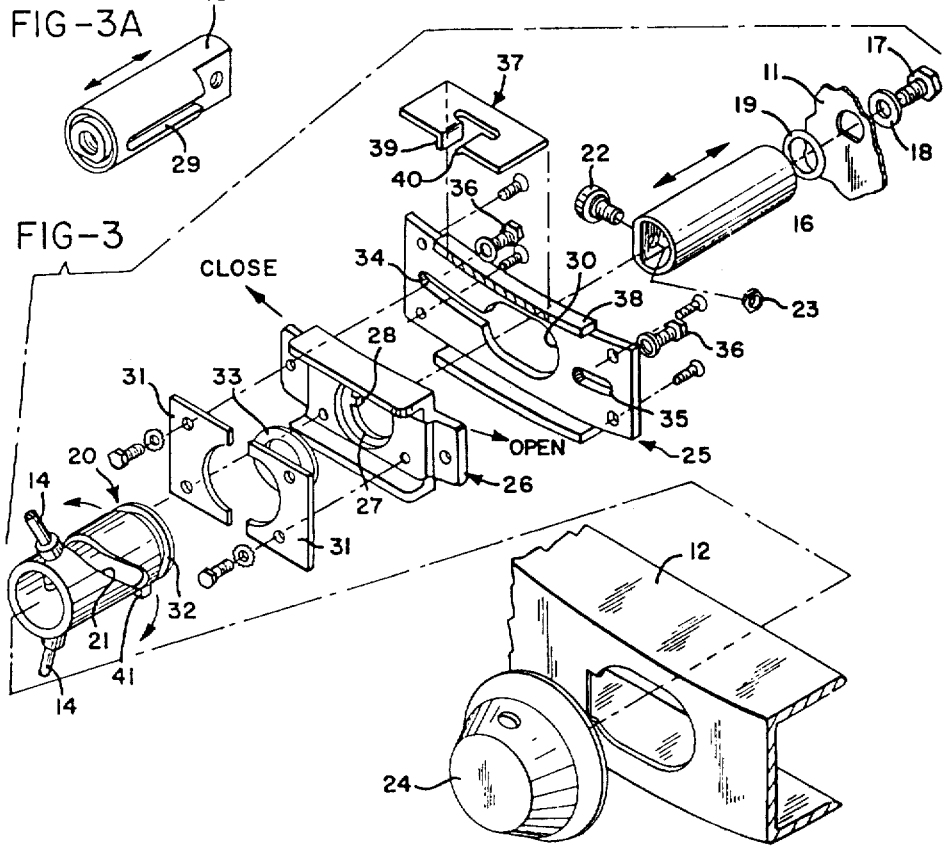
FIG. 3 is an exploded pictorial drawing of a door support assembly.

As shown in detail in FIG. 3, door 11 is supported by a stem 16, being attached thereto by a bolt 17, a washer 18 and a rubber seal 19. Stem 16 slides longitudinally in either the inward or outward directions, within a hollow cylindrical door closer cam 20. Door closer cam 20 is provided with a helical slot 21 for mating engagement with a roller 22 on stem 16. Roller 22 is attached to stem 16 as by nut 23 and follows slot 21, so that rotation of door closer cam 20 about a longitudinal axis causes inward or outward movement of stem 16. This movement of stem 16 necessarily produces a corresponding movement of door 11. As further shown in FIG. 3, door closer cam 20 is directly connected to operating handles 14, and may have a decorative cover 24.

There is an arc-shaped door base 25 which is attached to door support arm 12 as by an arrangement of bolts and tapped studs (not shown) and door base 25 supports a door slide 26 which is laterally slidable relative thereto. Door slide 26 has a circular aperture 27 for receiving stem 16, and there is a lug 28 in aperture 27 for engagement with a slot 29 on the left side of stem 16 (see FIG. 3A). Door base 25 has an aperture 30 through which stem 16 also passes, but aperture 30 is laterally elongated to accommodate lateral movement of the stem 16.

Figure 8:
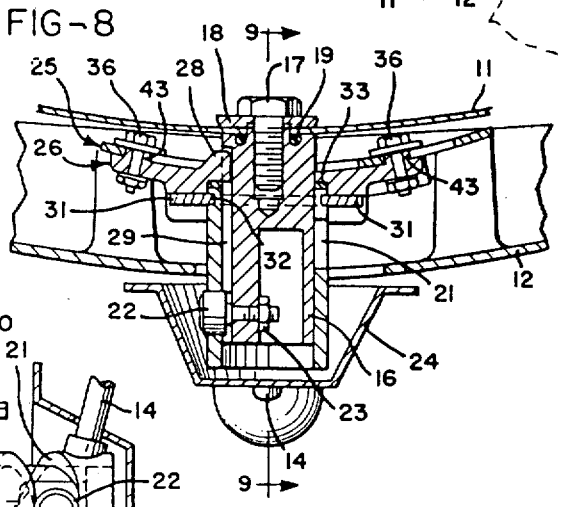
FIG. 8 is a further sectioned and somewhat enlarged view of a portion of FIG. 7.

Door closer cam 20 is retained by a pair of retainers 31 which grasp a groove 32 near the end of cam 20. Cam retainers 31 hold cam 20 against a thrust washer 33 which fits into door slide 26 as shown in FIG. 8. Door slide 26 has a pair of bosses 43 shown in FIG. 8 which fit inside slots 34 and 35 of door base 25. These bosses are bored for receiving a pair of bolts 36. Thus it will be seen that door base 25 is fixed relative to door support arm 12 while door 11 and stem 16, are movable both longitudinally and laterally in relation thereto. Door slide 26 and cam 20 are movable laterally relative to door support arm 12, and cam 20 is rotatable about a longitudinal axis to produce all of the aforementioned longitudinal and lateral movement.

Lateral movement of door 11 is accomplished by means of a shift plate 37 which is welded to the top of a ledge 38 forming a part of door base 25. Shift plate 37 has a first downturned lip 39 and a somewhat shorter second downturned lip 40 which cooperate with a lug 41 on door closer cam 20 as best illustrated in FIGS. 4A through 4C and 5A through 5C.

Figure 4A:
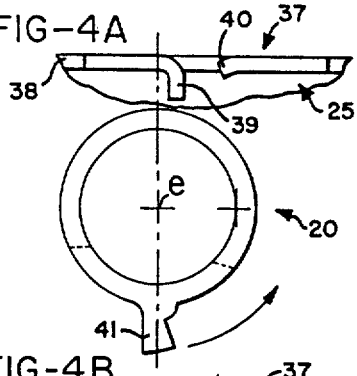
FIGS. 4A through 4C illustrate the cooperative action by the door closer cam and the shift plate during the door unlatching sequence.
Figure 4B:
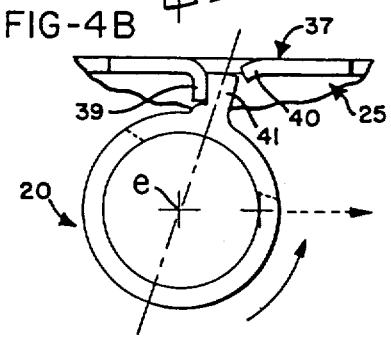
Figure 4C:
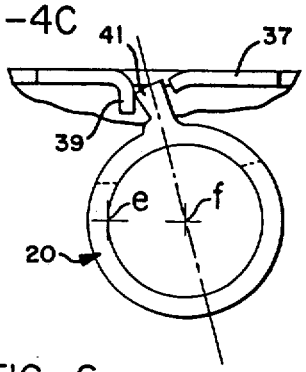

Referring now to FIGS. 4 and 5, when door 11 is in the fully closed and latched position, lug 41 extends downwardly below door closer cam 20 as illustrated in FIG. 4A. As mentioned above, door 11 is centered within access opening 13 when in the closed and fully latched position. At this time the center line of door closer cam 20 is positioned as illustrated at point e of FIG. 4A. To unlatch the door, operating handles 14 are rotated in a door releading, counterclockwise direction, which causes rotation of door closer cam 20 as indicated by the arrow in FIG. 4A. This rotation of door closer cam 20 causes inward movement of stem 16 to relieve the stress on door 11, while allowing the door 11 to remain in the above mentioned "centered" lateral position. After door closer cam 20 has been rotated approximately 162°, lug 41 comes into contact with the lip 39 of shift plate 40 as shown in FIG. 4B. In reaching this position in contact with lip 39, lug 41 passes under the lower edge of lip 40 without contact thereagainst. Further, after this rotation of about 162°, stem 16 has been moved inwardly sufficiently far to relieve all stress on door 11 and push door 11 inwardly out of engagement with rim 42 of access opening 13. Continued counterclockwise motion of operating handles 14 causes further longitudinally inward movement of door 11, and also causes lateral motion of door closer cam 20 so that its centerline moves from point e to point f as illustrated in FIG. 4C. This causes lateral motion of door 11 toward hinge line 15 of door support arm 12, so that it occupies position C of FIG. 7. This lateral motion of door 11 occurs during about 33° of cam rotation, so that the total rotation of operating handles 14 from the fully latched to the fully unlatched and shifted door operation is about 195°.

Figure 2:
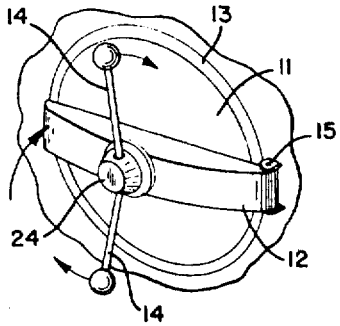
FIG. 2 is a pictorial illustration of a portion of the cooker of FIG. 1 with the access door closed.
Figure 5A:
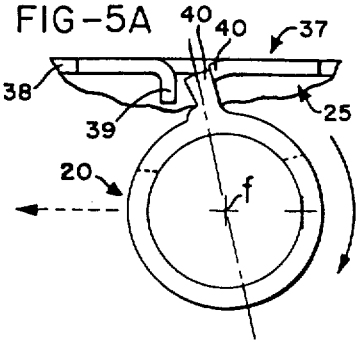
FIGS. 5A through 5C illustrate the cooperative action between the door closer cam and the shift plate during the door latching sequence.
Figure 5B:
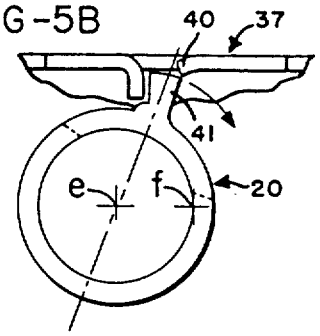
Figure 5C:
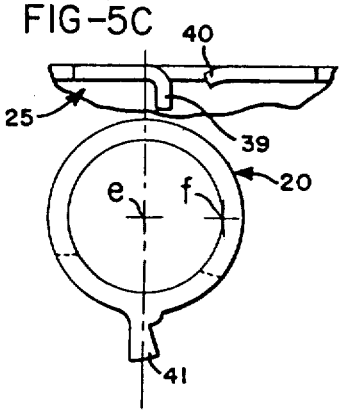

FIGS. 5A through 5C illustrate the cooperation between door closer cam 20 and shift plate 37 during the closing and latching operation. When door support arm 12 is swung inwardly for insertion of door 11 through access opening 13, cam 20 and shift plate 37 occupy the relative positions shown in FIG. 4C with door 11 being shifted laterally to the right or toward hinge line 15. After door support arm 12 has been swung into the fully closed position, as shown in FIG. 2, then the latching operation is commenced by rotating operating handles 14 in a door engaging, clockwise direction. For approximately 3° of handle rotation the only result is a longitudinally outward movement of stem 16 and door 11. At the end of this 3° lug 41 is in the position shown in FIG. 5A, at which point it contacts lip 40 of shift plate 37. This contact then begins causing a laterally leftward movement to center cam 20 and door 11 within access opening 13. The combined clockwise rotation and lateral translation of cam 20 causes lug 41 to move downwardly relative to lip 40, so that when cam 20 reaches the position illustrated in FIG. 5B lug 41 clears lip 40. At this point door 11 has been shifted to a fully centered position within access opening 13 and is ready to be moved outwardly thereagainst.

The lateral shifting represented as occurring between the positions illustrated in FIGS. 5A and 5B takes place during about 31° of operating handle rotation. Door 11 moves outwardly toward the inside rim 42 of access opening 13 during this period of time, but has not yet come into engagement therewith. Such engagement begins after about 3 more degrees of operating handle rotation, which is a total of about 37° of rotation from the position illustrated in FIG. 4C. Thereafter operating handles 14 are rotated an additional 158° to cause cam 20 to achieve the orientation illustrated in FIG. 5C. At this point door 11 is fully latched. It will be observed that no lateral translation of cam 20 takes place during the rotation from the position of FIG. 5B to the position of FIG. 5C.

It will be appreciated that all lateral translation of cam 20 as illustrated by FIGS. 4A through 4C and FIGS. 5A through 5C is accompanied by lateral translation of cam retainers 31, door slide 26, and stem 16, as well as the door 11. Door slide 26 slides along the face of door base 25, as above described, and this causes movement along an arc, rather than pure rectilinear translation in the lateral direction. As a result stem 16, door 11, and other elements attached thereto are angularly shifted about an angle $\theta$ as best illustrated in FIG. 7. It has been found that this combination of lateral and angular shifting provides optimal positioning of door 11 for passage through access opening 13 during opening and closing of the door. In the illustrated embodiment the angle $\theta$ is about 4°.

Figure 6:
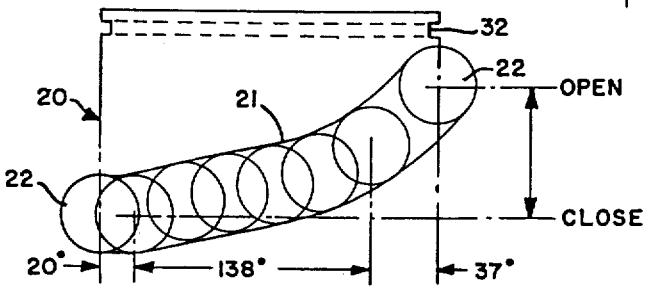
FIG. 6 is a developed view of the helical slot in the door closing cam.
Figure 9:
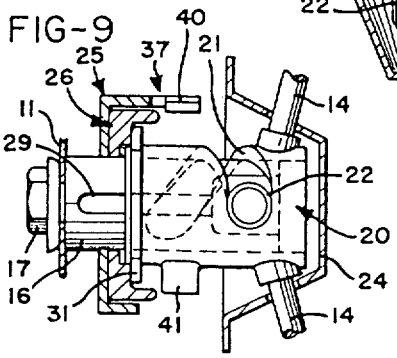
FIG. 9 is a view taken along lines 9—9 of FIG. 8.

The longitudinally inward and outwardly movement of stem 16 and door 11 may be better understood by reference to FIG. 9 which illustrates cam 20, cam slot 21, and roller 22 in detail. FIG. 9 shows the position which roller 22 occupies in slot 21 when door 11 is in the fully latched position. FIG. 6, which is a developed drawing of cam 20 shows the relative movement of roller 22 along slot 21 as cam 20 is rotated. For still further explanation a tabulation of longitudinal displacements which may accompany the angular rotation is included in Table I below:

TABLE I

| Cam Position (Degrees) | Cam Rotation (Degrees) | Longitudinal Movement (Inches) |
|---|---|---|
| 0 | — | — |
| 37 | 37 | .485 |
| 47 | 10 | .104 |
| 57 | 10 | .077 |
| 67 | 10 | .061 |
| 77 | 10 | .050 |
| 87 | 10 | .040 |
| 97 | 10 | .034 |
| 107 | 10 | .030 |
| 117 | 10 | .027 |
| 127 | 10 | .025 |
| 137 | 10 | .023 |
| 147 | 10 | .023 |
| 157 | 10 | .027 |
| 167 | 10 | .034 |
| 175 | 8 | .045 |
| 195 | 20 | .000 |

As indicated by Table I, and FIG. 6, the first 37° of latching rotation causes roller 22 to move longitudinally inward about 0.0485 inches, which is about 0.0138 inches per degree of rotation. This produces movement of door 11 outwardly from position C of FIG. 7 to a position of initial contact with rim 42. During this motion there are no door stresses to be overcome and thus cam slot 21 has a rather steep pitch.

At the end of the above mentioned 37° of rotation, the door stressing operation commences. For the next 138° of cam rotation the door will be stressed from its initially warped configuration to a spherical section of circular outline for sealing engagement against rim 42. In order to overcome the door stresses with a minimum of physical effort, cam slot 21 has a rather shallow pitch in the region engaged by roller 22 during stressing. At the point of greatest door stress this pitch produces only about 0.0023 inches of longitudinal advance per degree of cam rotation, which produces a mechanical advantage about six times greater than that available during the first 37° of rotation.

After completion of the above mentioned 138° of door stressing rotation, the pitch of slot 21 goes to zero, so that the last 20° of cam rotation produces no movement of roller 22 or door 11. This "flat spot" in the slot prevents door stresses from urging roller 22 inwardly toward the unlatched position. For the illustrated example, which has been quite successfully operated, the total longitudinal movement of roller is 1.085 inches and is accomplished concomitantly with the above described lateral and angular shifting.

While the form of apparatus herein described constitutes a preferred embodiment of the invention, it is to be understood that the invention is not limited to this precise form of apparatus and that changes may be made therein without departing from the scope of the invention.

What is claimed is:

1. In a pressure vessel having a wall provided with an access opening, apparatus for sealing a door against the inside surface of said wall to cover said opening comprising:

door support means supported exteriorly adjacent said wall, door mounting means supported by said door support means and extending inwardly through said opening for pulling said door toward said wall, said door mounting means comprising a cam follower and a cam having a cam surface having adjoining steeply pitched and gradually pitched surface portions for causing door movement along said axis at a relatively rapid rate when said cam follower moves against the steeply pitched portion of said cam surface and at a relatively slow mechanically advantageous rate when said cam follower moves against the gradually pitched portion of said cam surface, and door operating means connected to said door mounting means for producing relative movement between said cam and cam follower.

2. In a pressure vessel comprising a closable tank, a tank access opening, a normally warped closure door for sealing said opening, and stressing means rotationally operable about a longitudinal axis of said tank for flexing said door against said access opening; the improvement wherein said stressing means comprises cam means having a cam surface which is pitched at a relatively steep first angle for rapidly moving said door longitudinally toward a sealing rim of said opening and pitched at a smaller second angle for providing a large mechanical advantage to flex the door against said rim.

3. Apparatus according to claim 2 said first pitch angle producing in the order of about 0.0138 inches of door movement per degree of rotation of said stressing means and said second pitch angle producing in the order of about 0.0023 inches of movement of the door attachment point per degree of rotation of said stressing means.

4. Apparatus according to claim 2 said cam surface having a third region having substantially no pitch to provide for latching said door in a sealed and stressed position that is non responsive to door and vessel pressure stresses.

5. In a pressure vessel comprising a wall having an access opening, a normally warped closure door which is insertable through said opening, and stressing means [fo] *for* flexing said door against said wall to seal the access opening from the inside, the improvement wherein said stressing means comprises:

a door support arm mounted exteriorly of said wall and extending across said access opening from a fixed hinge located at one side thereof, door operating means mounted on said arm for rotation about a longitudinal axis and slidable laterally along the arm, a hollow cylindrical cam member mounted with its longitudinal axis coincident with the rotational axis of said door operating means, said cam member being provided with a radially extending projection reaching outwardly from the surface thereof, and a longitudinally extending helical slot, a cylindrical stem slidable longitudinally within said cam member and provided with a radially extending projection for mating engagement with said slot, said stem being secured to the exterior surface of said door so that when the door has been inserted through the access opening and centered therein, rotation of said door operating means rotates said cam member, pulls said stem outwardly and flexes said door against the inside surface of said wall to seal the access opening, and a shift plate mounted in fixed relation with said door support arm and cooperative with the projection of said cam member to cause lateral shifting of said cam member, said stem, and said door, when the door operating means are rotated as aforesaid.

6. The improvement of claim 5 wherein said helical slot has a first pitch angle for pulling said door from an initial position inside said pressure vessel outwardly for contact against the inside surface of said wall, a second pitch angle for flexing said door against said wall to seal said access opening, and a third pitch angle for latching said door in the sealed position.

[7. In a pressure vessel comprising a wall having an access opening, a normally warped closure door which is insertable through said opening, and stressing means for flexing said door against said wall to seal the access opening from the inside, the improvement wherein said stressing means comprises a door support arm mounted exteriorly of said wall and extending across said access opening from a hinge line at one side of the opening to an attachment point on the opposite side thereof, and means for securing said door on said arm movably both longitudinally and laterally relative thereto.]

8. [Apparatus according to claim 7 wherein] *In a pressure vessel comprising a wall having an access opening, a normally warped closure door which is insertable through said opening, and stressing means for flexing said door against said wall to seal the access opening from the inside, the improvement wherein said stressing means comprises a door support arm mounted exteriorly of said wall and extending across said access opening from a hinge line at one side of the opening to an attachment point on the opposite side thereof, and means for securing said door on said arm movably both longitudinally and laterally relative thereto; and* said stressing means further comprises operating means for producing said longitudinal movement and said lateral movement by rotation about a longitudinal axis.

9. Apparatus according to claim 8 wherein said stressing means further comprises means for causing the rate of said longitudinal movement to be dependent upon the rotational position of said operating means.

10. In a pressure vessel comprising a wall having an access opening, a normally warped closure door which is insertable through said opening, and stressing means for flexing said door against said wall to seal the access opening from the inside, improved mounting means for said door comprising a door support arm hinged along a fixed hinge line exteriorly of said opening and configured for extending exteriorly across said opening while supporting said door interiorly thereof, door operating means supported by said door support arm for operating said stressing means, and shifting means actuated by said operating means for shifting said door both laterally and angularly from a position facilitating insertion of said door through said opening to a position in alignment with said opening prior to said door flexing by said stressing means.

11. The improvement of claim 10 wherein said stressing means comprises a stem attached to said door and connected to said door operating means for longitudinal movement in response to actuation thereof.

12. The improvement of claim 10 wherein said shifting means comprises an arc-shaped door base provided with an aperture for passage of said stem therethrough and sliding means operable in response to actuation of said door operating means for causing said stem to slide laterally relative to said door and causing the longitudinal axis of said stem to shift angularly in accordance with the curvature of said door base.

13. The improvement of claim 12 wherein said door base is fixed relative to said door support arm.

14. The improvement of claim 10 wherein said door operating means comprises a door closer cam provided with a helical slot, means for manually rotating said cam about a longitudinal axis, and a cam follower attached to said stem and fitting within said slot for producing longitudinal movement of said stem in response to rotation of said cam.

15. The improvement of claim 14 wherein said helical slot is variably pitched for producing a longitudinal movement rate for said stem which varies in accordance with the rotational position of said cam.

16. The improvement of claim 15 wherein said cam is provided with a lug and said shifting means comprises means cooperative with said lug for causing said sliding of the stem to occur when said cam has been rotated to a predetermined position.

17. Apparatus for supporting and operating an interiorly fitting door against an entrance aperture in a pressure vessel comprising:

means suspended adjacent said aperture for removably mounting said door, means attached to said door mounting means for supporting said door thereon, said means for supporting including means for both angularly and laterally shifting said door with respect to said mounting means for optimally passing said door through said aperture into the pressure vessel; and means supported on said door mounting means for engaging and disengaging said door with the interior side of said aperture.

18. The apparatus of claim 17 wherein said means for angularly and laterally shifting includes a horizontally mounted curved guide member and wherein means connected with said door bears upon said guide member to move said door in a curved arc of lateral displacement while disengaged and within said pressure vessel.

19. The apparatus of claim 18 wherein said means for engaging and disengaging includes means for urging said door along said curved guide member as part of the door engaging and disengaging sequences.

20. The apparatus of claim 19 wherein said means for urging includes a cam member operative near one end of an operating stroke of said means for engaging and disengaging.

21. The apparatus of claim 17 wherein said means for mounting said door include an arm pivotally mounted at a fixed location on said pressure vessel.

22. The apparatus of claim 17 wherein said means for engaging and disengaging includes a helically slotted rotatable cam member and cam follower means engaged therewith and connected with said door for stressing said door during engagement with said apparatus.

23. In a pressure vessel comprising a wall having an acess opening, a normally warped closure door which is insertable through said opening, and stressing means for flexing said door against said wall to seal the access opening from the inside, the improvement wherein said stressing means comprises:

a door support arm mounted on said pressure vessel exteriorly of said opening, door operating means mounted on said arm, cam means including a hollow cylinder provided with a variably pitched helical slot, said cylinder being mounted on said arm for rotation about a generally longitudinal axis in response to actuation of said door operating means, and door mounting means movably supporting said door along said axis and including a stem which is slidable within said cylinder and which is provided with a projection for mating engagement with said slot whereby operation of said operating means causes movement of said door along said axis at a variable rate corresponding with variations in the pitch of said helical slot.

24. In a pressure vessel comprising a wall having an access opening, a normally warped closure door which is insertable through said opening, and stressing means for flexing said door against said wall to seal the access opening from the inside, the improvement wherein said stressing means comprises:

a door support arm mounted on said pressure vessel exteriorly of said opening, door operating means mounted on said arm, cam means provided with a variably pitched cam surface and mounted on said arm for rotation about a generally longitudinal axis in response to actuation of said door operating means, a shift plate mounted fast to said support arm, said cam means having a projection engageable with said shift plate to cause lateral shifting of said cam in response to rotation thereof, and door mounting means for supporting said door movably along said axis and cooperating with said cam surface to produce said movement at a variable rate corresponding with variations in the pitch of the cam surface.

25. Apparatus according to claim 1 wherein said cam comprises a hollow cylinder, said cam surface is a helical slot around said cylinder and said door mounting means comprises a stem slidable within said cylinder and having a projection for mating engagement with said slot.

26. Apparatus according to claim 25 further comprising a shift plate mounted fast to said door support means, said cam being provided with a projection engageable with said shift plate to cause lateral shifting of said cam in response to rotation thereof.

27. Apparatus according to claim 26 wherein said support means is an arm hinged to said wall along a fixed hinge line.

28. The improvement of claim 24 wherein said door support arm is hinged to said wall along a fixed hinge line.

29. The improvement of claim 28 wherein said shift plate has a first lip engageable by said cam projection to cause movement of said door toward said hinge line during door releasing rotation of said operating means and a second lip engageable by said cam projection to cause movement of said door toward the center of said access opening during door engaging rotation of said operating means.

* * * * *